Figure 2:
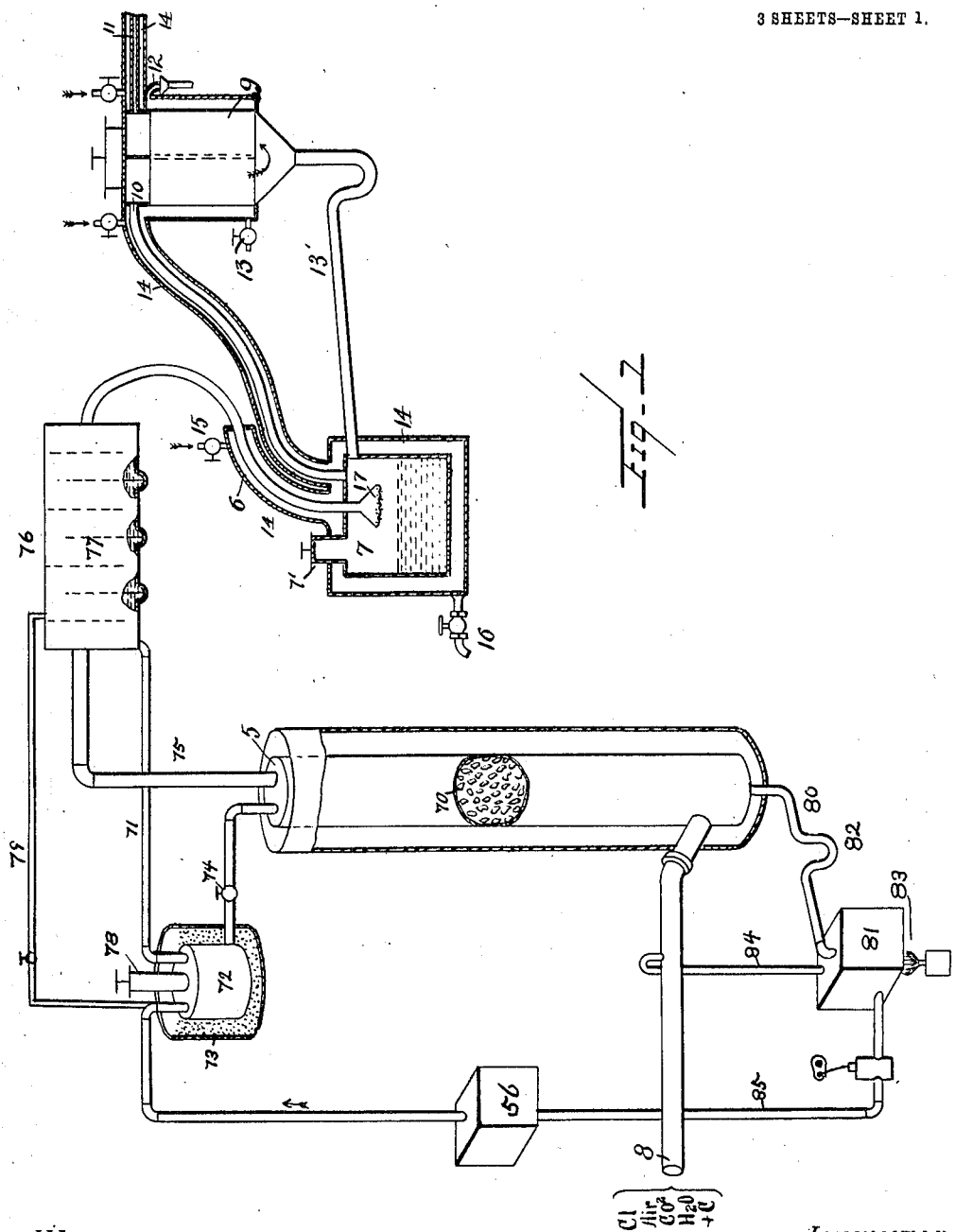
Figure 2:
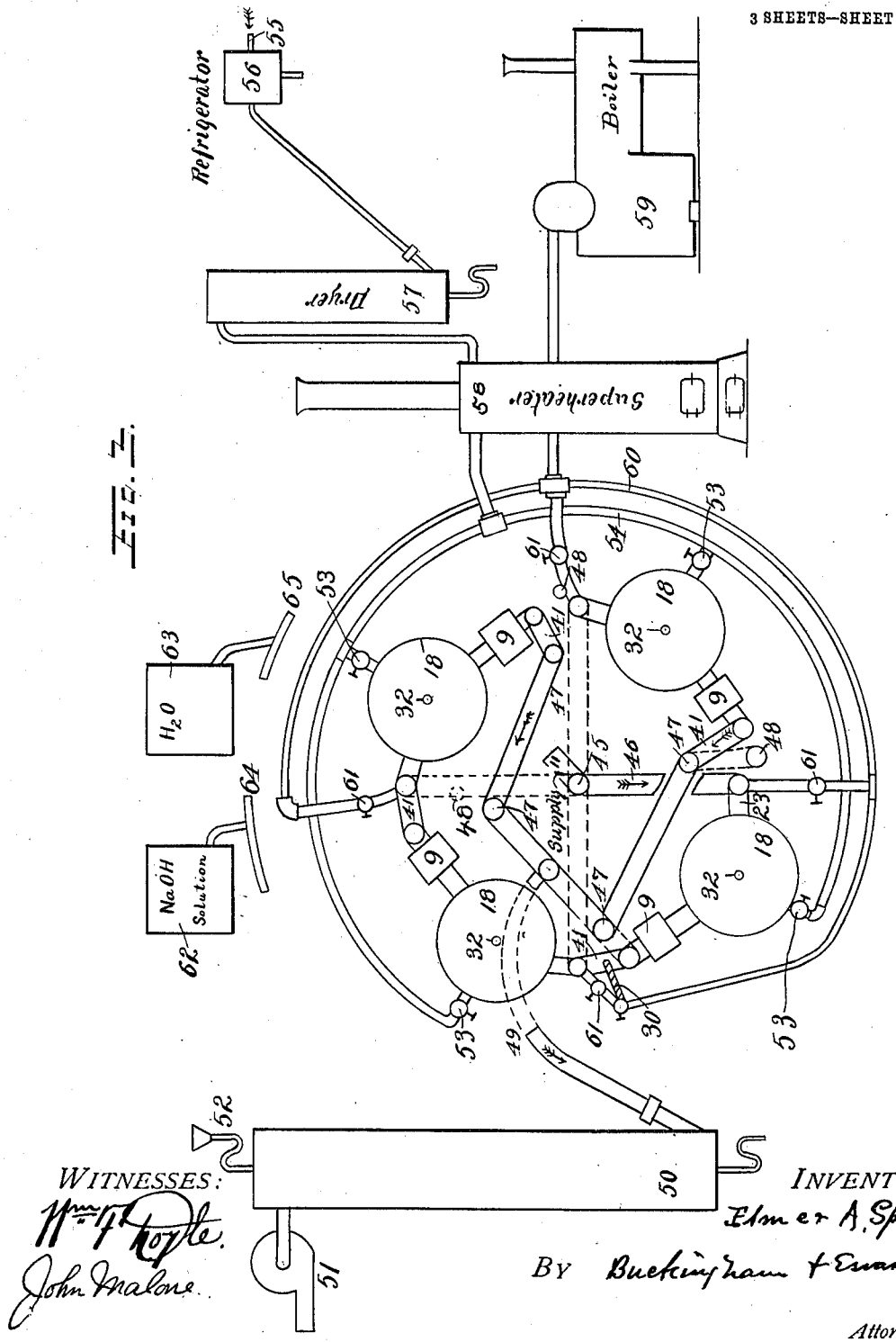

No. 872,092. PATENTED NOV. 26, 1907.
E. A. SPERRY.
PROCESS FOR DETINNING AND RECOVERING MERCHANTABLE IRON FROM TIN PLATE SCRAP.
APPLICATION FILED JAN. 22, 1907.

3 SHEETS—SHEET 1.

WITNESSES
INVENTOR
Elmer A. Sperry,
By Buckingham & Stewart
Attorneys

No. 872,092.
PATENTED NOV. 26, 1907.
E. A. SPERRY.
PROCESS FOR DETINNING AND RECOVERING MERCHANTABLE IRON FROM TIN PLATE SCRAP.
APPLICATION FILED JAN. 22, 1907.
3 SHEETS—SHEET 2.
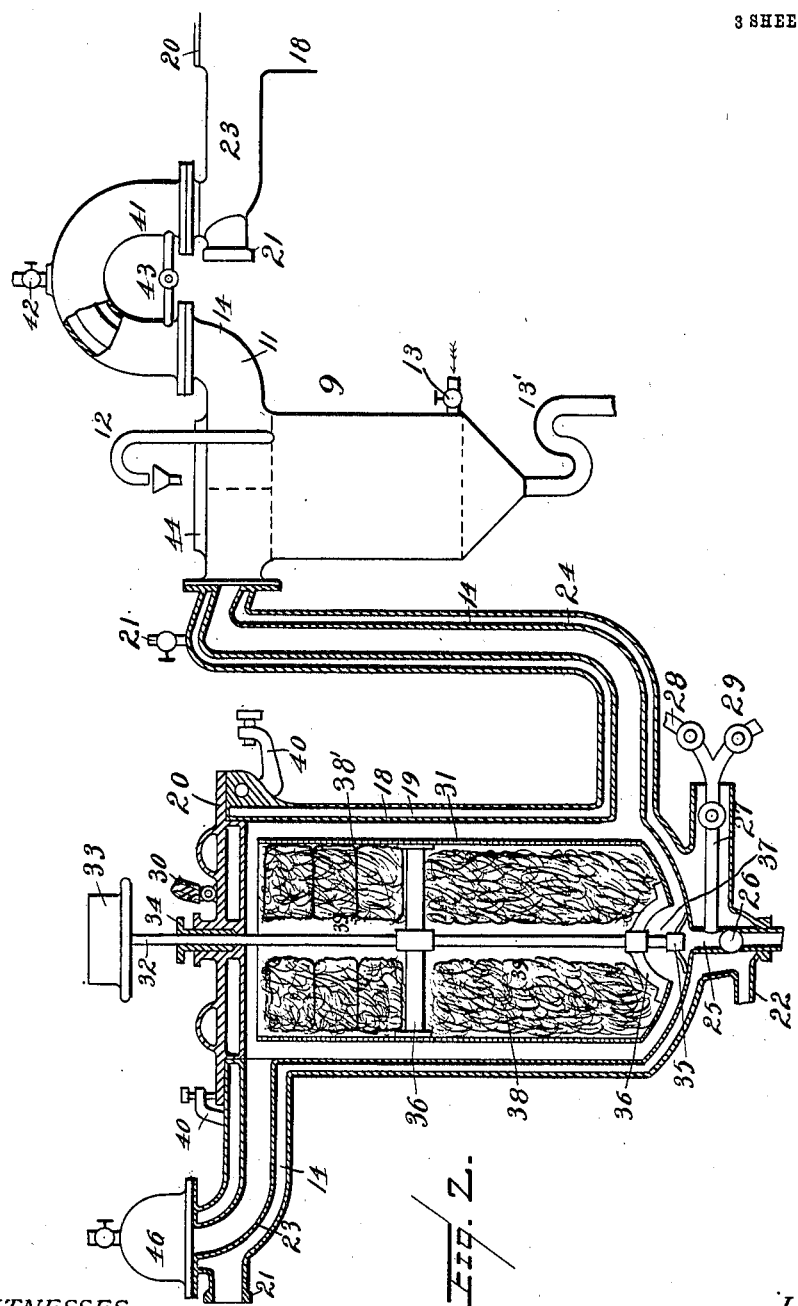
WITNESSES:
INVENTOR
Elmer A. Sperry.
BY Buckingham + Ewart
Attorneys No. 872,092. PATENTED NOV. 26, 1907.
E. A. SPERRY.
PROCESS FOR DETINNING AND RECOVERING MERCHANTABLE IRON FROM TIN PLATE SCRAP.
APPLICATION FILED JAN. 22, 1907.

3 SHEETS—SHEET 3.

WITNESSES:
Wm H Hoyle
John Malone

INVENTOR
Elmer A. Sperry
BY Buckingham + Ewart
Attorneys

UNITED STATES PATENT OFFICE.

ELMER A. SPERRY, OF BROOKLYN, NEW YORK.

PROCESS FOR DETINNING AND RECOVERING MERCHANTABLE IRON FROM TIN-PLATE SCRAP.

No. 872,092.  Specification of Letters Patent.  Patented Nov. 26, 1907.

Application filed January 22, 1907. Serial No. 353,561.

*To all whom it may concern:*

Be it known that I, ELMER A. SPERRY, a citizen of the United States, residing at Brooklyn, in the county of Kings and State of New York, have invented new and useful Improvements in Processes for Detinning and Recovering Merchantable Iron from Tin-Plate Scrap, of which the following is a specification.

My invention relates to the detinning of scrap and especially to the preparation, handling and manipulation of such scrap, and also the treatment of the black scrap after the detinning process has been accomplished. Some of the steps of this treatment and manipulation are equally applicable to any process of detinning, but it is contemplated to use these steps in connection with chlorin detinning, for which the apparatus illustrated herein is specially adapted.

The necessity for treatment after the detinning process, and especially the chlorin process, has been finished, may be stated briefly to arise partially from the fact that tin is the metal which is known to easily and almost instantaneously alloy itself with almost every other common metal. Especially is this true with iron, and the zone of alloy which is found to exist between the coating proper of tin upon a tin plate and the steel, has been fully discussed by me in this art. When the detinning takes place, this region of alloy should be thoroughly relieved of its tin factor, leaving the iron in the form of dust, and also a highly porous or spongy mass, which has become converted more or less into iron chlorid, and though dry, is in readiness to take on the hydrated form through its great affinity for moisture, being hydroscopic to the point of deliquescence. Another and entirely different phenomenon also exists when moist chlorin is used, or when such chlorin or associated vapors are accompanied by stannic chlorid hydrate. These substances may exist either as a solid or as a liquid, and when present in the reacting gases or vapors, are only with considerable difficulty separated from the surfaces of the steel plate after the tin has been removed. The presence of these substances tends to create the same chemical actions which are progressive in their nature, as has been discussed in my prior application above named.

The chlorin of commerce, or chlorin in its cheapest form and as most naturally produced, is not a dry product, but is moist, and though attempts have been made to dry it, yet the drying of chlorin is expensive, and the last traces of moisture are extremely difficult of removal. I have found that this may be best accomplished by subjecting the chlorin and accompanying gases and vapors to the treatment herein set forth in detail, where the moisture is converted into stannic chlorid hydrate, ahead of the process proper, and is caused to pass throughout the process in this state, which I have found renders it practically harmless, though in some instances and under proper temperature conditions, the hydrate may aid the formation of ferric chlorid above referred to, and hereinafter more fully discussed.

One form of apparatus in which the invention may be embodied is shown in the accompanying drawings, in which Figure 1 serves to illustrate one arrangement of treating apparatus, Fig. 2 a detail of one of the reaction vessels, and Fig. 3 a diagrammatic arrangement of the plant.

The same reference characters indicate like parts throughout the drawings.

In Fig. 1, 5 indicates a refrigerating apparatus and 6 means whereby the gases are heated between the refrigerating apparatus and the treating apparatus 7. It will be seen that the chlorin, chlorin and air, moisture or other ad-mixture of gases or vapors reach the apparatus at point 8 from any suitable source of supply, and after traversing the refrigerating and treating apparatus, pass to the condenser 9, whereby the excess liquid, vapors or solids are deposited. The gases reaching point 10 in this particular form of condenser, traverse downwardly through suitable passages to the bottom and thence upwardly on the right side to the eduction pipe 11. A visual overflow from the condenser is shown at 12 and induction pipe and valve at 13, whereby the cooling medium is made to traverse the condenser. It will be seen that the arrangement of apparatus is such that the efflux material from condenser 9 may traverse conduit 13'' and be returned to treating vessel 7. The jackets shown at 14, 14, etc., are supplied with suitable inlet devices 15 and outlet devices 16 as shown. Whereas these jackets are usually employed for heating purposes, yet they may be employed for cooling purposes as well without change of form.

The special form of refrigerator illustrated in Fig. 1 has for its object the thorough chilling of the gases by exposure of extremely large surfaces thereto. To this end the tower indicated at 5 is supplied with a filler, 70, exposing very large surfaces, as stated. The method of refrigerating the gases entering at 8 is a novel one, and consists in circulating a liquid which is refrigerated at 56 and circulated upwardly to container 72, which is shown as jacketed for purposes of insulation at 73. From this container the liquor passes downwardly through the tower being regulated by a valve 74, in such a way that the gases passing out through pipe 75 will be brought to the critical or desired temperature. It may be stated here that this temperature is just above the point at which chlorin hydrate forms. If the velocity of the gases is high, more or less moisture is mechanically carried with the gas from the tower 5 in the form of fog, or entrained vapors. This now passes to the refrigerated chamber 76, wherein the velocity is slowed down and the moisture deposited against the baffles 77, within the chamber. The moisture gathered at this point is returned to the circulating system by a pipe 71, to container 72. If chlorin hydrate forms in this container, it may be removed through an enlarged opening 78. Pipe 79 serves to supply the chilling medium to chamber 76, this chamber being held at any suitable temperature, preferably one that is a trifle lower than the outcoming gases from the tower 5. The liquor reaching the bottom of the tower 5, is then drawn through pipe 80 to the inclosure 81, through trap 82, where the excess chlorin may be driven off by heat from flame 83, or other treatment, the chlorin rising through pipe 84 to the main conduit 8, the liquor being pumped or otherwise forced back to the refrigerator 56 by pipe 85. A distributer 17 is employed in the treating chamber for an incoming supply and for bringing about better contact between treating materials and gases, as will readily be understood.

Passing now to the structure of one of the units of the plant, it will be seen that same consists essentially of a chamber 18, being provided with a jacket 19 and one or more removable ends or caps 20. The induction pipe for the jacket is shown at 21, 21, and the eduction pipe at 22. It will thus be seen that the gas inlet pipe 23 and outlet pipe 24 are jacketed in such a manner that its temperature is under control. Leading from the chamber are also other connections, one valved connection 25 at the bottom, the valve being indicated at 26, together with a jacketed connection 27, branches 28 and 29 supplied with valves as indicated. The end pieces, one of which is shown at 20, supplied with flexible connections to its jacket, shown at 30. The scrap in the present form of apparatus is loaded into a perforated rotating drum 31, mounted upon shaft 32, driven by any suitable means as by pulley 33, the shaft arising through a stuffing box 34 in one of the ends of the chamber 18. Suitable bearing as 35 supports one end of the shaft, and the spiders 36—36 serve to connect the rotating drum with the shaft in such a manner as to leave a central opening 37, the object of which will appear. The scrap which was more or less tightly packed into the drum 31, after rotation, is carried out toward the periphery, remains more or less tightly compacted there, and takes up the position indicated in the drawings and illustrated at 38, leaving central opening or channel, which is more or less free, indicated at 39, 39, or this central channel 39 may be left when filling the rotating drum 31 with the tightly compacted or "billeted" scrap indicated as filling a part of the cylinder at 38'. The end or ends of the chamber are held thereon removably as by clamps 40, one of which is shown in position after removal.

In Fig. 2, the inlet of a second chamber is shown at 23 to the right in the figure and the condenser 9 is also shown as between the two chambers 18—18, together with the removable connecting pipe 41, which may or may not be steam jacketed as shown. Where jacket is used, the induction 42 and the eduction 43 are employed for the jacket. The condenser induction and eduction ports are identical with those in Fig. 1, as is also the discharge for material and both gas conduits may or may not be jacketed as the case may require. Where jackets are used, they are indicated by 14—14—14, as in Fig. 1. It will be seen that the condensers are provided with removable portions as 44 for giving free access to the interior thereof.

Fig. 3 represents a diagrammatic view of one form of plant embodying the invention. In this figure will be seen an arrangement involving a plurality of chambers 18. The general arrangement of piping is also shown coupling these chambers with the other elements of the plant which are indicated diagrammatically. In this 'figure the lower right hand chamber 18 is shown to be out of circuit and in a certain peculiar stage of the operation as a whole. The others, starting with the lower left hand container receive the treated chlorin which has passed through the portion of the plant shown in Fig. 1 and has been delivered to point 45, from which the swinging connection, or the equivalent 46, delivers it to the neck 23 of the chamber mentioned, from which it passes in series through first the condenser 9, moving change pipe 41 which may be swung so as to connect with one of the covered openings 47, etc., as shown by dotted lines. It may also be swung to an intermediate position or blank 48, whereupon the pipe is closed, it being understood that the other openings are closed unless otherwise specified. After passing through the intermediate receiver 18 and condenser 9, the gases are drawn from the upper right hand condenser 9, with which the swinging pipe 41 is shown to be in connection with the opening 47, where it starts on its way, as indicated by the arrow, to the discharge pipe 49, connecting with the bottom of the tower 50, scrubber or its equivalent and which places all connecting parts normally under negative pressure. One means of impelling the gases is shown as by the exhausting device 51 at the top of the tower; 52 being a feeding device for any suitable material, such as stannous chlorid, stannic chlorid or solvent. The swinging pipe 41 that connects with condenser 9 of the lower right hand container does not draw its supply from pipe 11 or point 45, but rather from valve 53, which is closed in case of the other chambers but open in the particular stage of operations we are now considering, to the lower right hand chamber only. The supply pipe 54 feeds this chamber with previously dried superheated air. As a drying means I have shown an induction aperture 55 leading to the refrigerator 56, and thence to a calcium chlorid tower or equivalent 57 and thence to the superheating furnace 58, serving in double capacity of superheating both air and steam supplied from any suitable source such as boiler 59, and supplying the distributing pipe 60 with superheated steam, preferably with a high degree of superheat. The supply of steam is regulated as by valves 61, etc. By this means it is possible to raise the temperature of any or all of the chambers to a very high degree and also to regulate the temperature of the various jackets. For some purposes it is desirable that the jackets should not be as high in temperature as the chambers 18.

The branch pipes 28 and 29, see Fig. 2, leading to the interior of these chambers are suitably connected for supply and drain to the two containers 62 and 63 leading to supply mains 64 and 65, whereby any of the chambers may receive a supply of water, preferably under pressure, from one or sodium hydrate or suitable solution from another, or simultaneously from both for the purposes described.

I have now described my invention, its method of operation will be apparent from the foregoing and may briefly be stated as follows: Chlorin or the mixture of gases or gases and vapors entering in pipe 8 pass through usually and preferably drawn through the various devices in Fig. 1 whereby the gases are treated so as to be associated with a predetermined quantity of a drying active and reactive agent, such for instance as tetra chlorid of tin which in its anhydrous liquid form is contained in vessel 7, filled through an aperture 7', and with which the gases are thoroughly commingled and impregnated under conditions of temperature control, as clearly indicated, and from which the excess to any desirable degree is excluded as by a varying amount of cooling, chilling or refrigerating taking place in condenser 9, Fig. 1, the excess being returned to treating vessel 8, as described. The gases are now again heated in conduit 11, transmitted to point 45 on Fig. 3 where they start on their route in a clockwise direction, through a chamber or a series of chambers and intermediate and final condensers 9, thence to tower or scrubber 50 as pointed out. It should be explained that while the direction of gas around series is clockwise, the direction of the progression of freshly filled cylinders or chambers 18 is preferably counter-clockwise, thus it happens that the chamber that has been in longest is the one which receives the richest reaction agent from supply pipe 46, and the fresh material is acted upon by the residual chlorin or active reagent after it has been impoverished to a greater or less extent previously in the series. During the reaction period the heat of the reaction chamber 18 is adjusted as by valve 61 to bring about the best condition as experience will indicate, but I have found that a varying temperature is desirable and generally speaking a manipulation of temperature, through varying back and forth, should usually finish higher than at the start; for instance, the lower left hand chamber, as in the diagram, may be considered as being the hottest of the three active chambers, the upper right hand being the coolest. The product is drawn from pipe 13 of the condensers 9 and also is withdrawn by adjusting or opening cock 26 at the base of the active chambers 18. Product in the form of solution is also withdrawn from base of tower 50, as will be readily understood.

The manipulation within the chamber during the progress of the reaction, vaporizing, washing, fixation and drying of the scrap is as follows: The shaft 32 being revolved as stated, the scrap tends to pile around the periphery leaving a channel in the center shown at 39, Fig. 2, which communicates with opening 37. The centrifugal action is useful in all steps of the operation above described in that it tends to mobilize the liquid stannic chlorid as it is developed upon the extensive surfaces of the scrap through the stress thus developed. It also tends to move the scrap in such a manner as to open up the interior of the compact masses so that the chlorin has better access to the surfaces which are in contact, and furthermore the valuable chlorid is not allowed to drain down through and come in contact with the extended surfaces below, but is ejected from the perforated sides of basket 31 where they run down walls of chamber 18 and are drawn off at 26, as stated. The centrifugal action is also useful in washing, drying, treating, heating and vaporizing purposes, inasmuch as it materially hastens these processes through its agitation and especially through its definite directive circulation to the liquids or fluids during the progress of their action.

When it is indicated that the scrap has become detinned in the vessel, preferably the first of the series, it is disconnected and is subjected to any suitable series of manipulations which will produce the result, as for instance the one now to be described. Assuming now that the lower right hand chamber 18 and its condenser 9 constitute a unit which has been disconnected for purposes of finishing the black scrap and introducing fresh scrap, the steps in the operation may be described as follows: First the adjustable pipe 41 is left in connection with the tower through the opening 47 while the heat from the source of superheated steam supply is gradually augmented until the temperature is raised preferably still higher than during the reaction, even when it was longest in service, the vapors arising at this time are thus treated with a suitable solvent in tower 50. This is accomplished, for instance, by opening and adjusting valve 61 or opening a connection directly connecting pipe 60 with jacket 19 of chamber 18, this temperature should be brought to a point where the extended surface of the black scrap has been entirely freed from stannic chlorid hydrate which may have gathered or been deposited from the abundant supply of this material present during the reaction period. Next the air valve 53 is open to the chamber 18 and dried hot air is drawn in which is made to pass over and in contact with the scrap, preferably while in its heated state and put through condenser 9. The entrained vapors not deposited in the condenser pass to the tower as before and with the result stated. The heat from the jacket together with that introduced in connection with the air should raise the scrap to a higher point than is necessary for a complete removal of the stannic chlorid either anhydrous or hydrated, as described. The removal of the gases and vapors may be accomplished by displacement or by evacuation to any desired degree and by any well known means, which may be located suitably in the system, as, for instance, at 51.

It has been thought by former workers in this art that scrap that has been air washed, even at ordinary temperature, is fit for the market, this is true only to a limited extent, for if storage of the detinned scrap is involved, I have found such scrap to be totally unfit. I have discovered that though the scrap may be apparently dry, still there is a tendency to the presence of ferric chlorid either in the form of spots, specks or powder or a coat resting upon the surface of the scrap, this material is hydroscopic even to the point of deliquescence and the presence of water attacks the iron breaking up into the oxyhydrate developing more the chlorid compound and introducing a progressive action to which attention has already been called in this specification, and which if storage is attempted may go forward until the entire scrap is disintegrated and reduced to oxid or rust, losing its value from a standpoint of scrap to be melted; in fact, it becomes ore or oxid suitable only for smelting.

The next step in the treatment of black scrap is to disconnect the chamber from the tower by turning the pipe 41 on to the blank 48, whereupon the chamber is filled with any suitable washing solution, for instance water from pipe 65, or any suitable supply source, for instance tank 63. Agitation is continued by the turning of shaft 32 and preferably also heat may be simultaneously applied, whereby a very thorough washing of the scrap occurs. A number of waters may be applied if desired, and under such pressure as will best accomplish the purpose. The treatment is then concluded by throwing the scrap into the alkaline reaction or coating same by any suitable material, for instance, silicate of soda or by a solution of sodium hydrate, which may be supplied by pipe 64 from tank 62. This operation may preferably go forward at an elevated temperature, as this not only hastens, but also renders more effective the non-rusting qualities of black scrap. This solution is now withdrawn and preferably returned to the tank. Before being withdrawn from the container, the scrap is heated under the conditions of agitation described and thoroughly dried. The method of withdrawing consists of removing cover 20, together with the container 31, inserting another container filled with fresh scrap, replacing the cover and attaching the power connection here illustrated as being pulley 33. The vessel is now ready to take its place in the series, or preferably the scrap may now be treated with heat from the jacket 19 while the pipe 23 is still open or this pipe may be closed and the communication with the tower maintained in lieu thereof; the whole system, including the vessel 18 is therefore evacuated inasmuch as it sustains connection with the exhausting or pressure reducing means, 51, acting backwardly through the tower 50, pipe 49, etc. heated dry air as from pipe 54 circulating through the mass, whereby it becomes quickly and thoroughly dried before the chlorin connections are made for the reaction. This drying process may go forward under conditions of agitation, i. e. the perforated cylinder 31 is rotated, the contents being thereby placed under centrifugal stress and centrifugal action; as this tends to more thoroughly and quickly distribute the gases in contact with the surfaces exposed and greatly hastens this part of the operation affording the drying medium better access to the surfaces in the manner hereinbefore pointed out in connection with the access of the reagent to the same surfaces. The vessel 18 and contents is now understood to be in readiness for its proper connection in the series and application of the chlorin and associated reactive agents. This preferably is done while the scrap is still heated.

I claim:

1. Process of preparing merchantable iron from tin-plate-scrap which consists in refrigerating a reagent to dry it, elevating its temperature, treating the scrap therewith to remove the tin, and heating the resulting black scrap.

2. The process of preparing merchantable iron from tin-plate-scrap which consists in refrigerating a reagent to dry it, elevating its temperature, treating the scrap therewith to remove the tin, heating the resulting black scrap and washing same.

3. Process of preparing merchantable iron from tin-plate-scrap which consists in refrigerating a reagent to dry it, elevating its temperature, treating the scrap therewith to remove the tin, and heating the resulting black scrap and washing the same with a gas.

4. Process of preparing merchantable iron from tin-plate-scrap which consists in refrigerating a reagent to dry it, elevating its temperature, treating the scrap therewith to remove the tin, heating the black scrap and washing the same with a previously dried hot gas.

5. Process of preparing merchantable iron from tin-plate-scrap which consists in refrigerating a reagent to dry it, elevating its temperature, treating the scrap therewith to remove the tin and washing the resulting black scrap with a gas and then a liquid.

6. Process of preparing merchantable iron from tin-plate-scrap which consists in refrigerating a reagent to dry it, elevating its temperature, treating the scrap therewith to remove the tin, and washing the resulting black scrap with a hot liquid.

7. Process of preparing merchantable iron from tin-plate-scrap which consists in refrigerating a reagent to dry it, elevating its temperature, treating the scrap therewith to remove the tin and washing the resulting black scrap with water and then with an alkaline solution.

8. Process of preparing merchantable iron from tin-plate-scrap which consists in refrigerating a reagent to dry it, elevating its temperature, treating the scrap therewith to remove the tin, and washing the resulting black scrap with a hot alkaline solution.

9. The process of preparing merchantable iron from tin plate scrap which consists in treating the scrap with a suitable reagent for removing the tin, heating the resulting black scrap for driving off the reagent and product as vapor and treating such vapors with a suitable solvent.

10. The process of preparing merchantable iron from tin plate scrap which consists in treating the scrap with a suitable reagent for removing the tin then treating the resulting black scrap with hot water.

11. Process of preparing merchantable iron from tin-plate-scrap which consists in refrigerating a gaseous reagent by bringing the same into contact with a liquid refrigerant to dry it, elevating the temperature of the reagent, removing the tin thereby, and suitably treating the resulting black scrap.

12. Process of preparing merchantable iron from tin-plate-scrap which consists in refrigerating a gaseous reagent by bringing the same into contact with a liquid refrigerant and then removing the vapors therefrom to dry it, elevating the temperature of the reagent, removing the tin thereby, and suitably treating the resulting black scrap.

13. Process of preparing merchantable iron from tin-plate-scrap which consists in refrigerating a gaseous reagent by bringing the same into contact with a liquid refrigerant, then slowing down the velocity of the gas in an enlarged chamber to dry it, elevating the temperature of the reagent, removing the tin thereby, and washing the scrap.

14. Process of preparing merchantable iron from tin-plate-scrap which consists in refrigerating a gaseous reagent by bringing the same into contact with a liquid refrigerant, then slowing down the velocity of the gas in an enlarged chamber and chilling it to dry the reagent, elevating the temperature of the reagent, removing the tin thereby, and washing the scrap.

15. The process of preparing merchantable iron from tin plate scrap which consists in treating a gaseous reagent with a drying agent, removing the tin with the reagent thus treated and afterwards suitably treating the resulting black scrap to free it from any of the said drying agent deposited thereon from the treated reagent during detinning.

16. The process of preparing merchantable iron from tin-plate-scrap which consists in heating the scrap and treating the scrap with a reagent capable of removing the tin, suitably treating the resulting black scrap for the removal of the reaction products.

17. The process of producing merchantable iron from tin-plate-scrap which consists in heating the scrap, air-washing the same, treating the scrap with a reagent capable of removing the tin, suitably treating the resulting black scrap for removal of the reaction products.

18. The process of producing merchantable iron from tin-plate-scrap which consists in treating the scrap with hot inert gas heating the scrap and treating the scrap with a reagent capable of removing the tin, suitably treating the resulting black scrap for removal of the reaction products.

19. The process of producing merchantable iron from tin-plate-scrap which consists in treating the scrap with hot inert gas, removing such gas by suitable means, heating the scrap and treating the scrap with a reagent capable of removing the tin, suitably treating the resulting black scrap for removal of the reaction products.

20. The method of preparing merchantable iron from tin plate scrap which consists in detinning the scrap with a suitable reagent under conditions of varying the temperature during the reaction period, discontinuing the supply of the reagent and suitably treating the resulting black scrap for removal of the products.

21. The method of preparing merchantable iron from tin plate scrap which consists in detinning the scrap with a suitable reagent under conditions of varying the temperature by raising and lowering same during the reaction period, discontinuing the supply of the reagents and suitably treating the resulting black scrap for removal of the products.

22. The process of preparing merchantable iron from tin plate scrap which consists in treating the scrap with a suitable reagent for removing the tin, and treating the resulting black scrap with hot gas and then a liquid.

23. The process of preparing merchantable iron from tin plate scrap which consists in first air-washing the scrap under conditions of pressure, treating the scrap with a detinning reagent and suitably treating the resulting black scrap for removal of the products.

24. The process of preparing merchantable iron from tin plate scrap which consists in washing the scrap under conditions of increasing and decreasing pressure, treating such scrap with a detinning reagent and suitably treating the resulting black scrap for removal of the products.

25. The process of preparing merchantable iron from tin plate scrap which consists in washing the scrap under conditions of successively increasing and decreasing the pressures, treating such scrap with a detinning reagent and suitably treating the resulting black scrap for removal of the products.

26. The process of preparing merchantable iron from tin plate scrap which consists in washing the scrap under conditions of pressure with a heated gas and then treating the scrap with a detinning reagent and suitably treating the resulting black scrap for removal of the products.

27. The process of preparing merchantable iron from tin plate scrap which consists in first subjecting compressed scrap to heat and then treating such scrap with a detinning reagent while still in the heated state and suitably treating the resulting black scrap for removal of the products.

28. The process of preparing merchantable iron from tin plate scrap which consists in first subjecting compressed scrap to heat and pressure and then treating such scrap with a detinning reagent and suitably treating the resulting black scrap for removal of the products.

29. The process of preparing merchantable iron from tin plate scrap which consists in subjecting compressed scrap to the action of a detinning reagent and penetrating the interstices of such scrap by changing the temperature of such masses during detinning.

30. The process of preparing merchantable iron from tin plate scrap which consists in subjecting compressed scrap to the action of a detinning reagent and penetrating the interstices of the scrap by raising and lowering the temperature of such masses during detinning.

31. The process of preparing merchantable iron from tin plate scrap which consists in subjecting compressed scrap to the action of a detinning reagent and penetrating the interstices of such scrap by successively increasing and decreasing the temperature of such masses during detinning.

32. The process of preparing merchantable iron from tin plate scrap which consists in subjecting compressed scrap to the action of a detinning reagent and penetrating the interstices of such scrap by changing the temperature within the reaction chamber during detinning.

33. The process of preparing merchantable iron from tin plate scrap which consists in subjecting compressed scrap to the action of a detinning reagent and forcing the reagent into the interstices of the scrap by centrifugal action during detinning.

34. The process of preparing merchantable iron from tin plate scrap which consists in subjecting compressed scrap to the action of a detinning reagent and forcing the reagent into the interstices of the scrap by heat and centrifugal action during detinning.

35. The process of preparing merchantable iron from tin plate scrap which consists in subjecting compressed scrap to the action of a detinning reagent and forcing the reagent into the interstices of the scrap by varying the heat together with and while under centrifugal action during detinning.

36. The process of preparing merchantable iron from tin plate scrap which consists in subjecting compressed scrap to the action of a detinning reagent and forcing the reagent into the interstices of the scrap by opening up the masses during detinning.

37. The process of preparing merchantable iron from tin plate scrap which consists in subjecting compressed scrap to the action of a detinning reagent and forcing the reagent into the interstices of the scrap by opening up the masses through centrifugal stresses developed therein during detinning.

38. The process of preparing merchantable iron from tin plate scrap which consists in subjecting compressed scrap to the action of a detinning reagent and forcing the reagent into the interstices of the scrap by pressure developed at the surface of the scrap independent of those of the reagent during detinning.

39. The process of preparing merchantable iron from tin plate scrap which consists in subjecting compressed scrap to the action of a detinning reagent and forcing the reagent into the interstices of the scrap by mechanical pressures developed therein during detinning.

40. The process of preparing merchantable iron from tin plate scrap which consists in subjecting compressed scrap to the action of a detinning reagent within a reaction vessel and forcing the reagent into the interstices of the scrap by pressures developed therein independent of the pressures upon the reaction vessel during detinning.

In testimony whereof I have hereunto set my hand in presence of two subscribing witnesses.

ELMER A. SPERRY.

Witnesses:
C. W. MARSH,
DANIEL H. STALL.